United States Patent
Verberne et al.

(10) Patent No.: US 9,580,606 B2
(45) Date of Patent: Feb. 28, 2017

(54) METHOD FOR OBTAINING A CARBON BLACK POWDER BY PYROLYZING SCRAP RUBBER, THE CARBON BLACK THUS OBTAINED AND THE USE THEREOF

(71) Applicant: BLACK BEAR CARBON B.V., Baarn (NL)

(72) Inventors: Arnoldus Henricus Adrianus Verberne, Eindhoven (NL); Jan Anne Jonkman, Baarn (NL); Christopher Michael Twigg, Sittard (NL)

(73) Assignee: BLACK BEAR CARBON B.V., Baarn (NL)

( * ) Notice: Subject to any disclaimer, the term of this patent is extended or adjusted under 35 U.S.C. 154(b) by 92 days.

(21) Appl. No.: 14/367,121

(22) PCT Filed: Dec. 21, 2012

(86) PCT No.: PCT/NL2012/050919
§ 371 (c)(1),
(2) Date: Jun. 19, 2014

(87) PCT Pub. No.: WO2013/095145
PCT Pub. Date: Jun. 27, 2013

(65) Prior Publication Data
US 2014/0371385 A1    Dec. 18, 2014

(30) Foreign Application Priority Data
Dec. 22, 2011  (EP) .................................... 11195394

(51) Int. Cl.
*C09C 1/48*  (2006.01)
*C01B 31/08*  (2006.01)
(Continued)

(52) U.S. Cl.
CPC ............ *C09C 1/482* (2013.01); *C01B 31/081* (2013.01); *C08K 3/04* (2013.01); *C08K 3/36* (2013.01);
(Continued)

(58) Field of Classification Search
CPC ..... C09C 1/482; C09C 1/0081; C01B 31/081; C08K 3/04; C08K 3/36; C01P 2006/12; C01P 2006/19
(Continued)

(56) References Cited

U.S. PATENT DOCUMENTS

| 3,644,131 A | * | 2/1972 | Gotshall | ................. C08K 9/04 106/477 |
| 6,221,329 B1 | * | 4/2001 | Faulkner | ................. B07B 4/06 110/267 |
| 2008/0286192 A1 | | 11/2008 | Hamby | |

FOREIGN PATENT DOCUMENTS

| EP | 2319899 | 5/2011 |
| EP | 2465904 | 6/2012 |

(Continued)

OTHER PUBLICATIONS

International Preliminary Report on Patentability mailed Jun. 24, 2014 for parent International Patent Application PCT/NL2012/050919,.

*Primary Examiner* — Frances Tischler
(74) *Attorney, Agent, or Firm* — Casimir Jones, S.C.

(57) ABSTRACT

The present invention relates to a method for recycling scrap rubber comprising the steps of pyrolyzing scrap rubber to obtain a char material and milling the thus obtained char material. The present invention also relates to carbon black powders and carbon black pellets obtained by the method according to the invention. Moreover, the present invention (Continued)

relates to the use of said carbon black powder and to compositions comprising said carbon black powders.

20 Claims, 1 Drawing Sheet

(51) Int. Cl.
*C08K 3/04* (2006.01)
*C08K 3/36* (2006.01)
*C09C 1/00* (2006.01)

(52) U.S. Cl.
CPC ........ *C09C 1/0081* (2013.01); *C01P 2006/12* (2013.01); *C01P 2006/19* (2013.01)

(58) Field of Classification Search
USPC .................................................. 521/40–49.8
See application file for complete search history.

(56) References Cited

FOREIGN PATENT DOCUMENTS

| WO | 00/53385 | 9/2000 |
| WO | 2011/035812 | 3/2011 |

* cited by examiner

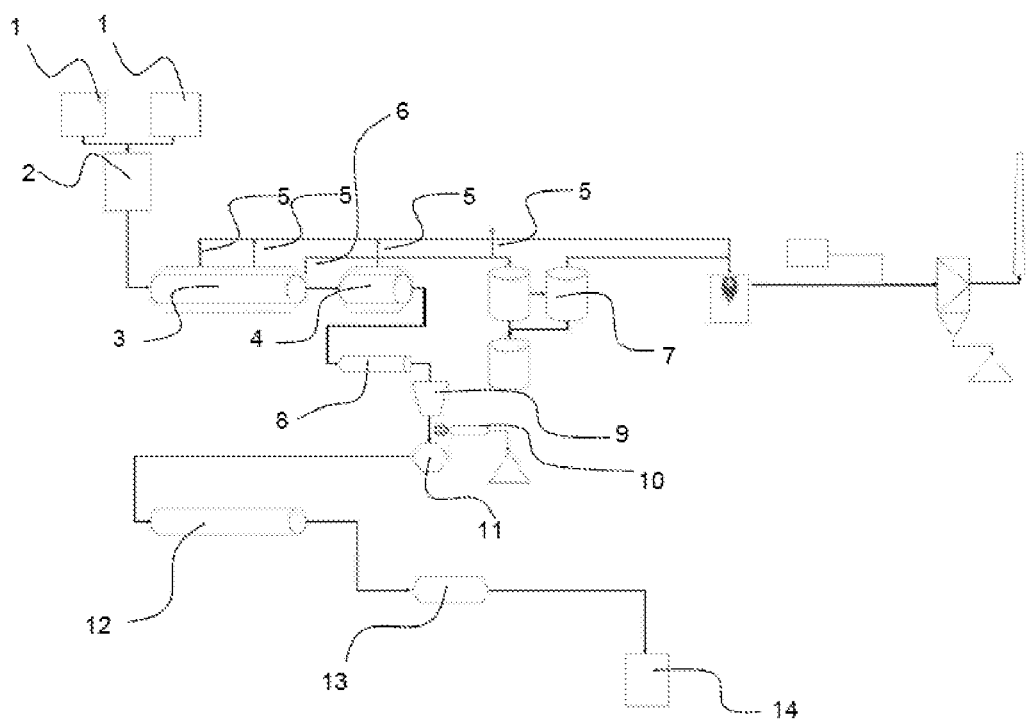

METHOD FOR OBTAINING A CARBON BLACK POWDER BY PYROLYZING SCRAP RUBBER, THE CARBON BLACK THUS OBTAINED AND THE USE THEREOF

CROSS REFERENCE TO RELATED APPLICATIONS

The present application is a Section 371 U.S. national stage entry of pending International Patent Application No. PCT/NL2012/050919, International Filing Date Dec. 21, 2012, which published on Jun. 27, 2013 as Publication No. WO 2013/095145A1, which claims the benefit of EP Patent Application No. 11195394.9, filed Dec. 22, 2011, the contents of which are incorporated by reference in their entireties.

BACKGROUND

The present invention relates to a method for recycling scrap rubber comprising the steps of pyrolyzing scrap rubber to obtain a char material and milling the thus obtained char material. The present invention also relates to carbon black powders and carbon black pellets obtained by the method according to the invention. Moreover, the present invention relates to the use of said carbon black powder and to compositions comprising said carbon black powders.

Tyre recycling or rubber recycling is the process of recycling tyres (generally vehicles' tyres) that are no longer suitable for use on vehicles due to wear or irreparable damage (such as punctures). These tyres are also known as 'End-of-Life' (ELT) tyres. These tyres are among the largest and most problematic sources of waste, due to the large volume produced and their durability.

Used rubber tyres from sources such as automobiles and lorries include materials that, if successfully recycled, may be used for a wide variety of industrial uses. Extending the lifetime of the materials in such tyres is an area of intense interest, in particular, in the implementation of cradle-to-cradle products in the tyre industry.

Recycling tyres is, however, a difficult and costly process and as a result millions of tyres every year are worn out and accumulated, often in landfill sites. Scrap tyres are bulky and they take up a significant amount of space, even if compacted. Furthermore such used tyres also cause air pollution if burned.

One known way to recycle tyres is by means of pyrolysis. Pyrolysis uses heat in the absence of oxygen to decompose the tyre to yield steel, volatile gases and carbonaceous char. The carbonaceous char material is rich in carbon black which can be used for a number of applications.

However, an economically viable way to reprocess the scrap tyres into valuable end materials is not known. Examples of valuable products into which carbon black powder derived from scrap rubber could be compounded include car and light truck tyres, shoe soles and heels, conveyor belts, car- and houseware-mats, brake and clutch pads, V-belts, flooring, cable insulation, hoses.

Currently, the carbon black powder derived from scrap tyres has a number of problems associated with it, for example, a high volatile content precludes the prior art carbon black from being milled to a particle size of less than 40 micron This is because high amounts of volatiles reduces the ability of the char to be milled. In the art, a char material with a high volatile content is known as 'brittle'. This so called brittleness is a key factor in determining the millability of a material, thereby making a char material progressively less millable as the volatile content increases. Thus such carbon black cannot be added to the said valuable products.

U.S. Pat. No. 5,037,628 discloses a pyrolysis method for reclaiming carbonaceous materials from scrap tyres by pyrolyzing the scrap tyres in a one step pyrolysis process to form a char material.

US2002119089 describes a one stage process for pyrolyzing scrap tyres involving the use of a rotating auger. The carbon black product has an average particle size of 0.125 mm making the product only suitable for low grade applications.

US 2008286192 describes a batch process for the two-stage pyrolysis of tyres. The char material is not milled but used directly in rubber formulations.

A problem with the char material obtained by pyrolyzing scrap rubber according to methods of the prior art is the inability to mill the char material to a particle size that is suitable for use in valuable products. Unacceptably high levels of volatiles that are present in the obtained char materials preclude the milling to carbon black powder.

OBJECTS OF THE INVENTION

It is therefore an object of the present invention to provide a method of pyrolyzing scrap tyres to produce a char material that can be milled to produce a carbon black powder that can be used in rubber and thermoplastic compositions.

Another object of the present invention is to provide a carbon black powder for use as a filler or reinforcement in rubber having improved properties.

Another object of the present invention is to provide carbon black powder having the particle size distribution of some commercially available carbon black powders with the use of a much cheaper and more readily available feedstock (scrap tyres).

SUMMARY OF THE INVENTION

The present invention provides in a first aspect a method for recycling a scrap rubber, in particular tyres, which method comprises the following steps:
  i) pyrolyzing a scrap rubber to obtain a char material;
  ii) milling the char material obtained in step i) to obtain a carbon black powder;
characterized in that the pyrolysis in step i) comprises at least a two-stage pyrolysis process, wherein the said two-stage pyrolysis comprises:
  a) a first pyrolysis stage to obtain an intermediate char material and
  b) a second pyrolysis stage to obtain a char material and wherein at least one of the stages a) or b) is carried out in a rotary kiln.

In an embodiment, in the first pyrolysis stage a) the percentage of volatiles present in said scrap rubber is reduced to an amount of about 5-10 wt. % based on the total weight of the intermediate char material, and wherein the intermediate char material is introduced in the second pyrolysis stage b) in which the percentage volatiles is further reduced to a percentage of less than 2.5 wt. %, preferably less than 2.0 wt. %, based on the total weight of the char material.

In an embodiment, the temperature during the first pyrolysis stage a) is preferably 500-800° C., more preferably 600-700° C. and even more preferably 630-670° C.

In an embodiment, the temperature during the second pyrolysis stage b) is preferably between 550-800° C., more preferably 650-750° C. and even more preferably 680-720° C.

In an embodiment, the residence time of each the first pyrolysis stage a) and the second pyrolysis stage b) are independently between 20-50 minutes, preferably 25-45 minutes and more preferably 30-40 minutes In an embodiment, the residence time of each of the first pyrolysis stage a) and the second pyrolysis stage b) is substantially equal in duration.

In an embodiment, in the second pyrolysis stage a) the percentage volatiles is reduced to less than 1.0 wt. % based on the total weight of the char material.

In an embodiment, the milling of step ii) is carried out by jet milling using compressed air or steam.

In an embodiment, the milling of step ii) is carried out in such a way that the carbon black powder obtained from step ii) has a particle size distribution of D50<10 µm and D99<40 µm, preferably a particle size distribution of D50<5 µm and D99<20 µm, more preferably a particle size distribution of D50<1 µm and D99<10 µm, even more preferably a particle size distribution of D50<0.5 µm and D99<2 µm.

In an embodiment, an additional step of pelletizing ((step iii)) is carried out after step ii).

In an embodiment, the pelletizing of step iii) is carried out by mixing a bonding agent with the carbon black powder obtained in step ii) and pelletizing the mixture thus obtained to obtain a pelletized carbon black powder.

In an embodiment, the bonding agent is pre-gelatinated starch.

The invention also relates to a scrap rubber derived carbon black powder, wherein the scrap rubber derived carbon black powder comprises:
  a) 60-98 wt. % of carbon black,
  b) less than 2.0 wt. % of volatiles,
  c) 0-30 wt. % of silica.

In another embodiment, a scrap rubber derived carbon black powder according to the invention further comprises 1-5 wt. % zinc oxide, based on the total weight of the carbon black powder, In another embodiment, a scrap rubber derived carbon black powder according to the invention further comprises 1-5 wt. % zinc sulphide, based on the total weight of the carbon black powder.

In another embodiment, the ratio between zinc oxide and zinc sulphide is between 1:10 to 10:1, preferably between 1:2 and 2:1.

In another embodiment, a scrap rubber derived carbon black powder according to the invention has a particle size distribution of preferably D99 less than 30 µm and D50 less than 6 µm, preferably D99 less than 20 µm and D50 less than 4 µm, more preferably D99 less than 9 µm and D50 less than 3 µm, even more preferably D99 less than 4 µm and D50 less than 0.3 µm.

In another embodiment, a scrap rubber derived carbon black powder according to the invention has, a BET surface area of at least 60 m²/g, preferably at least 70 m²/g and even more preferably a BET surface area of at least 75 m²/g.

In another embodiment, a scrap rubber derived carbon black powder according to the invention has a particle size distribution of D50<0.5 µm and a BET surface area of at least 75 m²/g.

In another embodiment, a scrap rubber derived carbon black powder according to the invention has a STSA (statistical thickness) surface area of at between 46-86 m²/g, preferably 59-79 m²/g, even more preferably 64-74 m²/g.

In another embodiment, a scrap rubber derived carbon black powder according to the invention has a polyaromatic hydrocarbon (PAH) content less than 0.50 mg/kg, preferably less than 0.25 mg/kg, more preferably less than 0.01 mg/kg.

In another embodiment, a scrap rubber derived carbon black powder according to the invention has an oil absorption number between 67-97 m³/g, preferably 72-92 m³/g, more preferably 77-87 m³/g.

In another embodiment, a scrap rubber derived carbon black powder according to the invention has a primary particle size of 20-40 nm, preferably 26-36 nm, more preferably 28-34 nm.

The invention also relates to a scrap rubber derived carbon black pellet comprising:
  a) 60-98 wt. % of carbon black,
  b) less than 2.0 wt. % of volatiles,
  c) 0-30 wt. % of silica and
  d) 0.5-1.0 wt. % bonding agent.

In yet another embodiment, the scrap rubber derived carbon black pellet according to the invention has a bonding agent which is starch, preferably pre-gelatinated starch.

In yet another embodiment, the scrap rubber derived pelletized carbon black powder according to the invention, has a starch concentration of preferably between 0.1 and 6.0 wt. %, more preferably 0.3 and 5.0 wt. %, even more preferably 0.5 and 3.0 wt. %, even more preferably 0.5 and 1.5 wt. % of the total weight of the scrap rubber derived carbon black pellet.

In another aspect of the invention, the invention relates to the use of a scrap rubber derived carbon black powder according to the invention, as a filler or reinforcing agent in a rubber composition, an ink, a paint, a bitumen, a thermoplastic composition or a thermoplastic elastomer.

In another aspect of the invention, the invention relates to a rubber composition comprising a scrap rubber derived carbon black powder according to the invention, said rubber composition having a tensile strength of 15-30 MPa, preferably 20-29 MPa, more preferably 22-28 MPa.

More embodiments of the present invention are cited in the appended claims. The invention will be further elucidated in the detailed description below.

DEFINITIONS

The following are definitions of some of the terms used throughout the description and claims.

With 'scrap rubber' is meant rubber waste material. In generally, but not exclusively this scrap rubber is obtained from tyres that are no longer suitable for use.

With 'char material' is meant a solid carbonaceous material obtained from pyrolysis of a scrap rubber material. Typical components of a char material are carbon black, residue material, silica, volatiles and water.

With 'residue material' is meant one or more of an inorganic ash and any other compounds or elements present in the char material (or carbon black powder as defined herein) that constitute the mass balance of the char material. The residue material may optionally contain zinc oxide (ZnO), zinc sulphide (ZnS), titanium dioxide ($TiO_2$), calcium oxide (CaO), aluminium oxide ($Al_2O_3$), iron oxide ($Fe_2O_3$), magnesium oxide (MgO), sodium phosphorus, bromine, chlorine, potassium, and fluorine.

With 'carbon black' is meant a black finely divided form of amorphous carbon. In other words, a virtually pure elemental carbon in the form of colloidal particles. Carbon black is, for example, produced by incomplete combustion or thermal decomposition of gaseous or liquid hydrocarbons under controlled conditions. Its physical appearance is that of a black, finely divided pellet or powder. Its use in tires, rubber and plastic products, printing inks and coatings is related to properties of specific surface area, particle size and structure, conductivity and colour.

The definition of carbon black as used herein does not include soot (finely divided carbon deposited from flames during the incomplete combustion of organic substances such as coal) or black carbon (pure carbon in several linked forms obtained through the incomplete combustion of carbon-containing materials). Soot and black carbon are the two most common, generic terms applied to various unwanted carbonaceous by-products resulting from the incomplete combustion of carbon-containing materials, such as oil, fuel oils or gasoline, coal, paper, rubber, plastics and waste material. Soot and black carbon also contain large quantities of dichloromethane and toluene extractable materials, and can exhibit an ash content of 50% or more.

Carbon black is chemically and physically distinct from soot and black carbon. Most types of carbon black contain more than 97% of elemental carbon, said elemental carbon is generally arranged as aciniform (grape-like cluster) particulate.

In the case of commercially available carbon blacks, organic contaminants such as polycyclic aromatic or polyaromatic hydrocarbons (PAHs; defined below)) are present in extremely small quantities (for example between 200-736 mg/kg depending on the grade, manufacturing method and feedstock type) and, therefore, they are not considered to be biologically available.

With 'furnace carbon black' is meant commercially available carbon blacks derived from the incomplete combustion of liquid hydrocarbons under controlled conditions. This method is suitable for mass production due to its high yield, and allows wide control over its properties such as particle size or structure. This is currently the most common method used for manufacturing carbon black for various applications from rubber reinforcement to colouring. Examples of furnace carbon blacks include, N110, N220, N330, N550, N660 and N772 manufactured by companies such as Birla Carbon, Cabot Corporation and Orion Engineered Carbons.

With 'thermal carbon black' is meant a carbon black derived from the thermal decomposition of natural gas in the absence of oxygen.

By 'carbon black powder' is meant a powdery form of carbon black. In other words, fine particulates of carbon black. Carbon black powder in the composition according to the invention obtained by milling of a char material, the carbon black powder comprising, for example, carbon black, residue material, silica, volatiles and water.

With 'scrap rubber derived carbon black powder' is meant a carbon black powder derived from a scrap rubber, preferably a carbon black powder that is obtained from the pyrolysis of a scrap rubber.

With 'pyrolysis' is meant a process of thermochemical decomposition at elevated temperatures of an organic material in the absence of oxygen.

With 'two-stage pyrolysis' is meant a process of pyrolysis that conducted in at least two separate stages, that is at least a first stage and at least a second stage. In other words, at least two subsequent pyrolysis processes are carried out. It is clear therefore that the invention also relates to two-stage pyrolysis that comprises more than two consecutive steps, for example at least a third pyrolysis step and optionally for example at least a fourth pyrolysis step. It is also possible that there are two first pyrolysis stages, in other words wherein an additional stage is introduced between the first and second stages a) and b). The product of the at least first pyrolysis stage is herein referred to as an intermediate char material and the product of the at least second pyrolysis stage is herein referred to as a char material. The at least second pyrolysis stage may be also referred to as the polishing stage. The two stages may be conducted in the same pyrolysis apparatus or in two separate pyrolysis apparatuses. The two stages may be conducted in, for example, a rotary kiln, for example in two rotary kilns, or for example in a batch reactor and a rotary kiln.

With 'rotary kiln' is meant a cylindrical vessel, inclined slightly to the horizontal, which is rotated about its axis. The material to be processed is fed into the upper end of the cylinder. As the kiln rotates, material gradually moves down towards the lower end, and may undergo a certain amount of stirring and mixing. Hot gases pass along the kiln. The gases may pass along the kiln in the same direction as the process material (concurrent), but preferably pass along the kiln in the opposite direction (counter-current). The hot gases may be generated in an external furnace, or may be generated inside the kiln, e.g. by a flame.

With 'volatile' is meant any element or compound that is removed in a gaseous state during the pyrolysis of scrap rubber. In other words, an element or compound that is readily evaporated. Typically the volatiles released during pyrolysis can be classified as non-condensable and condensable.

The 'non-condensable volatiles' are volatiles having a low boiling point of between −200° C. and 80° C. Examples are hydrogen ($H_2$), methane ($CH_4$, boiling point −162° C.), ethane ($C_2H_6$, boiling point −89° C.), propane ($C_3H_8$, boiling point −42° C.), butane ($C_4H_{10}$, boiling point 0° C.), pentane ($C_5H_{12}$, boiling point 36° C.), hexane ($C_6H_{14}$, boiling point 69° C.), carbon monoxide (CO), carbon dioxide ($CO_2$), sulphur (S) or nitrogen ($N_2$). The non-condensable volatiles are present in approximately 10-40% by weight, preferably 15-30% by weight, more preferably 20-25% by weight of the total weight of volatiles. Typically at least 70% of the non-condensable volatiles has a boiling point in the range of −200° C. to 80° C.

The 'condensable volatiles' are volatiles having a boiling point between 85 and 290° C. The condensable volatiles account for approximately 60-90% by weight, preferably 70-85% by weight, more preferably 75-80% by weight of the total weight of volatiles. The condensable volatiles are generally oil components.

The condensable volatiles have a typical boiling point range between 85° C. and 138° C., between 139° C. and 155° C., between 156° C. and 180° C., between 181° C., and 206° C., between 207° C. and 245° C., between 246° C. and 270° C. or between 271° C. and 290° C. Typically, at least 70% of the condensable volatiles components have a boiling point in the range of 85° C. and 290° C.

With 'residence time' is meant the length of time or duration in which the material is present in the pyrolysis apparatus during the pyrolysis step itself. In other words, the time during which the pyrolysis process takes place. In other words, the time during which the pyrolysis apparatus is in operation. In other words, the reaction time of the pyrolysis process.

With 'milling' is meant the process of breaking down a material (in the present invention the char material) into smaller particles, preferably individual (viz. non-agglomerated) particles or small agglomerates (e.g. smaller than 40 micron in diameter). The material which is obtained after milling is in the present invention a carbon black powder. The skilled person is familiar with a number a method suitable for the milling of char material. Examples of such milling methods and apparatuses are fluidized bed opposed jet mills and spiral jet mills in combination with air classifiers.

With 'particle size distribution of D99' or 'particle size distribution of D50' is meant the $99^{th}$ and $50^{th}$ percentile of the particle size distribution, respectively, as measured by volume. The D99 describes a sample of particles whereby 99 vol. % of the particles have a size smaller than the stated particle size distribution. With a D99<x micrometer is meant that 99 vol. % of the particles has a size of less than x micrometer. The D50 describes a sample of particles whereby 50 vol. % of the particles have a size smaller than the stated particle size distribution. With a D50<x micrometer is meant that 50 vol. % of the particles has a size of less than x micrometer.

Carbon black's particle size distribution is an important property. For a given loading of carbon black, the blackness and the strength of reinforcement increase with decreasing particle size distribution.

Aggregate size and shape (structure) also affect a carbon black's end-use performance, as higher carbon black structure increases viscosity and improves dispersion. The stiffness (modulus) of elastomer systems becomes significantly higher with increasing structure. The preferred method for measuring these properties is transmission electron microscopy.

The particle size distribution can be determined according to the method disclosed in: ASTM D3849-2011. The particle size distribution can also be determined using dry or wet laser diffraction on an instrument such as a Malvern Mastersizer S Ver 2.19. If a wetting agent is required, this may be, for example, a mixture of the commercially available products Morvet®+Supragil® (ratio of 70:30). A person skilled in the art will know which type of wetting agent is suitable for use during a wet laser diffraction measurement. External ultra-sound may be applied to prevent aggregation of the particles. More details on the exact conditions used for the measurements in the present invention can be found in the Examples below.

With 'BET surface area' is meant the surface area and porosity of the particles present in a sample. The BET surface area is a measure of the physical adsorption of gas molecules on a solid surface and serves as the basis for an important analysis technique for the measurement of the specific surface area of carbon black. BET measures the specific surface area of 1 gram of carbon black expressed in square meters. The BET surface area therefore provides information about the physical adsorption of gas molecules on a solid surface. Molecules of an adsorbate gas are physically adsorbed onto the particle surfaces, including the internal surfaces of any pores, under controlled conditions within a vacuum chamber. An adsorption isotherm is obtained by measuring the pressure of the gas above the sample as a function of the volume of gas introduced into the chamber. The linear region of the adsorption isotherm can then be used to determine the volume of gas required to form a monolayer across the available particle surface area, using BET theory, as described by the following equation:

$$\frac{1}{v_m\left[\left(\frac{P}{P_0}\right)-1\right]} = \frac{c-1}{v_m}\left(\frac{P}{P_0}\right) + \frac{1}{v_m c}$$

where v is the volume of gas, P is the pressure, $P_0$ is the saturation pressure, $v_m$ is the volume of gas required to form a monolayer and c is the BET constant. Plotting relative pressure, $\phi$ (=P/P0), and volume, allows the volume of a monolayer to be determined from the gradient and intercept of the line. The specific surface area can then be calculated using the cross sectional area of the gas molecules, the molecular volume of the gas and the weight of the sample. BET surface areas can be measure according to ASTM D-6556-2010.

With 'statistical thickness surface area' or 'STSA' is meant the specific surface area that is accessible to rubber, per meter squared per gram ($m^2$/g). This is used by the rubber industry to define the carbon black fineness level—the higher the number the finer the carbon black. This can be measured according to ASTM D-6556-2010.

With 'polyaromatic hydrocarbon' or 'polycyclic aromatic hydrocarbon' or 'PAH' is meant a class of molecules consisting of fused aromatic, carbon rings that do not contain heteroatoms or carry substituents (other than hydrogen). Examples of PAHs include but are not limited to Benzo(a)anthracene, (CAS 56-55-3) Benzo(a)phenanthrene (chrysene), (CAS 218-01-9), Benzo(a)pyrene, (CAS 50-32-8), Benzo(b)fluoranthene, (CAS 205-99-2) Benzo(j)fluoranthene (CAS 205-82-3), Benzo(k)fluoranthene, (CAS 207-08-9), Benzo(j,k)fluorene (fluoranthene), (CAS 206-44-0), Benzo(r,s,t)pentaphene, (CAS 189-55-9) Dibenz(a,h)acridine (CAS 226-36-8), Dibenz(a,j)acridine (CAS 224-42-0), Dibenzo(a,h)anthracene (CAS 53-70-3) Dibenzo(a,e)fluoranthene (CAS 5385-75-1), Dibenzo(a,e)pyrene (CAS 192-65-4), Dibenzo(a,h)pyrene (CAS 189-64-0), Dibenzo(a,l)pyrene (CAS 191-30-0), 7H-Dibenzo(c,g)carbazole (CAS 194-59-2), 7,12-Dimethylbenz(a)anthracene (CAS 57-97-6), Indeno(1,2,3-cd)pyrene (CAS 193-39-5), 3-Methylcholanthrene (CAS 56-49-5), 5-Methylchrysene (CAS 3697-24). Nitropyrene (CAS 5522-43-0), Acenaphthene, (CAS 83-32-9), Acenaphtylene (CAS 208-96-8), Anthracene (CAS 120-12-7), Benzo(g,h,i)perylene (CAS 191-24-2), Fluorene (CAS 86-73-7), Phenanthrene (CAS 85-01-8), Pyrene, (CAS 129-00-0).

With 'primary particle size' is meant the size of a particle of carbon black powder as measured by diffraction methods. The primary particle size can be measured according to ASTM D-6556-2010. Carbon blacks do not exist as primary particles as such. During the manufacture of carbon black the primary particles fuse to form aggregates. The shape and degree of aggregate branching is referred to as structure. Increasing structure typically increases modulus, hardness, electrical conductivity and compound viscosity and improves dispersability of carbon black. Typical carbon black primary particle size ranges from 8 nanometers for furnace blacks to 300 nanometers for thermal blacks. Finer particles (viz. having a primary particle size of less than 50 nanometer) increase reinforcement, abrasion resistance, and improve tensile strength.

With 'oil absorption number' or 'OAN' is meant the number of grams of oil needed to bind one gram of particles. Oil absorption is the measure of structure with a high number representing higher structure. Oil absorption is measured according to ASTM D-2414-2012. Generally, high structure blacks impart higher levels of mechanical reinforcement to a rubber compound (e.g. tensile strength) and lower dynamic performance (e.g. rebound resilience as defined below) whereas low structure blacks impart relatively lower levels of mechanical reinforcement and better dynamic performance.

With 'tensile strength' is meant the stress that a particle can withstand without deformation, as measured in force per unit area, $N/m^2$ or MPa. The tests were conducted according to ISO 37-2011.

With 'cross-link density' is meant is meant the difference between the maximum and minimum torque as measured on a rubber compound using an Oscillating Disk Rheometer (ODR) or a Moving Die Rheometer (MDR), often referred to as the "MH-ML" or "Delta S" value.

With 'bonding agent' is meant a substance that permits agglomeration of the individual particles of carbon black powder into free-flowing pellets of suitable structural strength and improve stability. A bonding agent is also known in the art as a binder.

With 'SBR' is meant styrene-butadiene rubber. SBR describes a family of synthetic rubbers derived from styrene and butadiene. These materials have good abrasion resistance and good aging stability when protected by additives. SBR is the most common rubber from which tyres are made. The styrene/butadiene ratio influences the properties of the polymer: with high styrene content, the rubbers are harder and less rubbery.

With 'EPDM' is meant ethylene propylene diene monomer (M-class) rubber. M class refers to its classification in ASTM standard D-1418-2010. The M class includes rubbers having a saturated chain of the polymethylene type. Dienes currently used in the manufacture of EPDM rubbers are dicyclopentadiene (DCPD), ethylidene norbornene (ENB), and vinyl norbornene (VNB).

With 'DeMatia flex fatigue' is meant the resistance of a rubber compound to cyclic flexing and is measured according to ISO 132-2011.

With 'M100' is meant the stress measured at 100% strain on a standard rubber dumb-bell. M100 is measured according to ISO 37-2005.

With 'M300' is meant the stress measured at 300% strain on a standard rubber dumb-bell. M300 is measured according to ISO 37-2005.

With 'elongation' is meant the ultimate elongation at break of a standard rubber dumb-bell. Elongation is measured according to ISO 37-2005.

With 'rebound resilience (Schob)' is meant the percentage resilience of a rubber compound as an indication of hysteretic energy loss that can also be defined by the relationship between storage modulus and loss modulus. The percent rebound measured is inversely proportional to the hysteretic loss. Rebound resilience is measured according to ISO 4662-2009.

With 'PHR' is meant Parts per Hundred of Rubber. PHR is a measure that is used by rubber chemists to depict what amount of certain ingredients are needed in the rubber compounding.

DETAILED DESCRIPTION

The inventors have found a method for recycling a scrap rubber, in particular tyres, which method comprises the following steps:

i) pyrolyzing a scrap rubber to obtain a char material;

ii) milling the char material obtained in step i) to obtain a carbon black powder;

characterized in that the pyrolysis in step i) comprises at least a two-stage pyrolysis process, wherein the said two-stage pyrolysis comprises:

a) a first pyrolysis stage to obtain an intermediate char material and b) a second pyrolysis stage to obtain a char material and wherein at least one of the stages a) or b) is carried out in a rotary kiln.

The invention is based on the following. Firstly, the inventors found that the particle size of prior art scrap rubber derived carbon black is too high to meet current demands on carbon black powders. The inventors further found that the milling of char material obtained from prior art scrap rubber pyrolysis processes is not sufficiently possible. Following, the inventors inventively found that this problem with milling was at least partly due to the high volatile content of the char material. Subsequently, the inventors have invented the present two stage pyrolysis process in order to provide char material having a lower volatile content. This inventive char material is suitable for milling to a lower particle size and hence meets the current requirements in the field of carbon black.

In other words, the inventors have invented a new process for recycling of scrap rubber, preferably from tyres. The present method of recycling comprises the steps of i) pyrolyzing the scrap rubber to obtain a char material and ii) milling thus obtained char material to obtain a carbon black powder, wherein the pyrolysis step consists of at least two stages.

The scrap rubber (preferably scrap tyres) that can be used in the method according to the invention may be any type of rubber, preferably vehicle tyres. Even though below there will be a discussion of the present method in relation to tyres, it should be noted that the present invention is not limited to tyres. Scrap tyres are processed into the form particles, e.g. in the form of granules or chips. Preferably, the scrap rubber particles (used as the scrap rubber in the present invention) have a maximum particle size of 30×30× 30 mm, more preferably a maximum particle size of 20×20× 20 mm, even more preferably a maximum particle size of 10×10×10 mm.

The rubber composition used in a vehicle tyre is specific for the function of the tyre. In other words, during the manufacturing of a tyre the composition thereof is selected for the type and function of tyre that is produced. For example, truck tyres are typically low in silica (approximately 5 wt. %, based on the total weight of the rubber composition). Automobile tyres, specifically passenger car tyres, may be either designated as 'low silica' (approx. 10 wt. %, based on the total weight of the rubber composition) or 'high silica.' (approx. 15 wt. %, based on the total weight of the rubber composition). Addition of silica to a rubber is believed to result in a reduction in rolling resistance. Rolling resistance is defined as the amount of energy a tyre absorbs as it revolves and deflects. Assuming correct tyre pressures are maintained and making allowance for varying speeds and different driving characteristics, a 20% reduction in rolling resistance can be achieved by adding silica to rubber composition used for automobile tyres. The lower the rolling resistance the less fuel is required to propel the vehicle forward. Lowering the rolling resistance, however, commonly results in a reduction in wet grip performance, which of course is unacceptable. A compromise is therefor sought during the manufacturing of a tyre between decreasing the rolling resistance on the one hand and increasing the wet grip performance on the other hand. Depending on the type and function of the tyres the optimal amount of silica is selected.

Given the variety of scrap tyres, the method according to the invention is suitable for pyrolyzing scrap rubber with varying amounts of silica. Preferably, the feedstock tyres used to prepare the scrap rubber used as a starting material in the present method have a silica content of less than 15%, more preferably less than 10% and even more preferably less than 5%.

The feedstock tyres (used to prepare the scrap rubber used as a starting material in the present method) are, in an embodiment of the present invention, are reduction in size fed into the pyrolysis apparatus via a gravimetric feeding screw. The pyrolysis apparatus may be for example a rotary kiln operating in a two stage mode. Briefly, the rotary kiln is a rotating cylinder inclined at an angle (e.g. an angle of 1.5°) that is enclosed in a furnace along its active length and can be equipped with gas-tight seals that prevent interchange between the internal atmosphere and local ambient conditions. As the cylinder rotates, the material is gently tumbled as it flows from the feed end of the cylinder to the discharge end.

For example, the pyrolysis can be carried out in an indirectly heated rotary kiln that is preferably either heated by gas or electrically heated. Preferably, at least one or both of the stages a) and b) of the pyrolysis are carried out in a rotary kiln operating in counter current flow. The rotary kiln can be prepared for continuous pyrolysis of the scrap rubber feedstock operating in counter current flow. By counter current flow, is meant the oils (viz. the condensable volatiles) and vapours (viz. non-condensable volatiles) released during the pyrolysis step are removed from the rotary kiln at the same side of the kiln at which the feedstock (scrap rubber) is added. Typical technical parameters for such a rotary kiln are an overall length of 9.0 m, an inner diameter of 0.4 m, a heating zone length of 3.0 m in a nitrogen atmosphere (oxygen free atmosphere) with a rotational speed of 1-2 RPM, for example 2-3 RPM, for example 3-4 RPM, for example 4-5 RPM.

The construction and operation of such a rotary kiln as found by the inventors, enables a two stage pyrolysis to be carried out in which the scrap rubber is heated to a first temperature during stage a), and then to a second temperature during stage b), which is preferably higher than the first temperature. The resultant char material obtained after second pyrolysis stage b) has a low volatile content, preferably less than 2.0 wt. % and the thus obtained char material can then be milled to obtain a carbon black powder.

The invention, is however, not limited to the use of solely a rotary kiln. For example, the a first pyrolysis stage a) may take place in a first rotary kiln and the a second pyrolysis stage b) in a second rotary kiln. In such a set-up the second kiln is referred to as a polishing kiln and it is by using such a polishing kiln that a very low volatile content can be achieved.

In a further example, the a first pyrolysis stage a) may be conducted in a batch reactor that is known per se in the art. The second pyrolysis stage b) may than be conducted in a rotary kiln. A batch reactor has the disadvantage over a kiln operating in continuous mode, in that a batch reactor can only contain a limited amount of feedstock and must be alternately filled, the pyrolysis step conducted and then emptied. However, taking the intermediate char material from a batch reactor and then subjected the thus obtained intermediate char material to a second pyrolysis stage in a rotary kiln operating according to the invention, would enable an inventive char material to be produced with a low volatile content.

Without wishing to be bound to any theory, the present inventors have discovered that if the char material comprises more than 5 wt. % volatiles, milling of the obtained char material is difficult and leads to a low grade product that does not have the required dispersion, particle size distribution or reinforcing qualities necessary to be used in rubber or thermoplastic compositions.

The pyrolysis of scrap rubber according to the invention enables the char material to be milled so that a carbon black powder is obtained that can be used in valuable end products. One or more of the objects of the invention are therefore achieved.

In an embodiment of the invention in the first pyrolysis stage a), the percentage of volatiles in the scrap rubber is reduced to an amount of about 5-10 wt. % based on the total weight of the intermediate char material.

In another embodiment of the invention in the second pyrolysis stage b) the percentage of volatiles present in said intermediate char material is reduced to a percentage of less than 2.5 wt. % based on the total weight of the char material.

The two stage process according to the present invention enables the weight percentage of volatile compounds to be reduced to less than 10 wt. % after the first stage and to less than 2.5 wt. %, preferably less than 2.0 wt. % after the second stage. Such a low volatile content of the final product cannot be obtained by the methods present in the prior art. The inventors have found that the volatiles are preferably removed in a rotary kiln. Without wishing to be bound by theory, a rotary kiln enables volatiles to be removed more easily from the pyrolysis process. Specifically, a pyrolysis process comprising a first and a second pyrolysis stage is sufficiently efficient to reduce the volatile content to below the desired 2.0 wt. % level in an economically viable way. This contrasts to typical batch process in which the char material obtained therefrom has a volatile content in the range from about 6% to 15%. However, a batch process is very suitable for use during the at least one first pyrolysis stage.

Preferably, a counter current flow of gases is applied in the rotary kiln during its operation. A counter current flow enables a char material to be produced with a low weight percentage of volatile compounds. This is because the gases are drawn away from the product and so any volatile compounds that are made free during the pyrolysis step do not remain in contact with the char material and thus can not be reabsorbed by the char material. In other words, the use of a counter current flow during pyrolysis increases the yield of the reduction of volatiles.

In an embodiment, the temperature during the first pyrolysis stage of the pyrolysis in step i) is preferably 500-800° C., more preferably 600-700° C. and even more preferably 630-670° C. The advantages of these ranges are that the condensable volatiles and the most readily removed fractions of the volatile components (viz. the non-condensable volatiles) can be removed without leading to increase (or advanced) decomposition of the intermediate char material.

In an embodiment, the temperature during the second pyrolysis stage of the pyrolysis step in i) is preferably between 550-800° C., more preferably 650-750° C. and even more preferably 680-720° C. The advantage of these ranges are that the less volatile fraction of the volatile components in the intermediate char material are removed without causing further unwanted, decomposition of the char material. If the temperature is too high physical and chemical reactions can occur in the char material. For example, the structure of the carbon black can be adversely affected and the carbon can be oxidised by any residual oxygen species present in the pyrolysis apparatus.

The temperature of the first and/or second pyrolysis stage is hereby understood to mean the temperature to which the pyrolysis apparatus is heated. The temperature during the first and/or second pyrolysis stages is preferably substantially constant during the residence time. With substantially constant is meant a deviation of maximally ±10% of the set temperature (viz. the temperature to which the pyrolysis apparatus is set) during the residence time.

For example, a rotary kiln can be divided into zones, and each zone heated independently. For example. in a rotary kiln subdivided into four zones, zone 1 and zone 2 may be heated to 630° C. and zone 3 and zone 4 may be heated to 680° C. It is therefore clear that zones 1 and 2 comprise the first pyrolysis stage and zones 2 and 3 comprise the second pyrolysis stage. There are of course further combinations of zones and temperatures possible which fall in the scope of the invention.

Preferably, the temperature in the second pyrolysis stage a) is higher than in the first pyrolysis stage b), because this higher temperature draws out the least volatile components of the char material.

More preferably, the temperature in the second pyrolysis stage a) is at least 30° C., preferably at least 50° C. higher, more preferably at least 80° C. higher, than in the at least first pyrolysis stage b), because this higher temperature draws out the least volatile components of the char material. In this way the first pyrolysis stage removes the first part of all the volatiles at a lower temperature to reduce any risk of decomposition. During the second pyrolysis stage a large part of the remaining volatiles are removed which cannot be removed so easily at the lower temperature at which the first pyrolysis stage is carried out (at least not during acceptable residence times). This is why during the second pyrolysis stage the temperature is increased.

In an embodiment, the residence time of each the first pyrolysis stage a) and the second pyrolysis stage b) are independently between 20-50 minutes, preferably 25-45 minutes and more preferably 30-40 minutes.

In an embodiment, the residence time of each of the first pyrolysis stage a) and the second pyrolysis stage b) is substantially equal in duration. With substantially equal is meant a deviation of maximally ±10% of the residence time between the first and second pyrolysis stages. For example, if the first pyrolysis stage residence time is 35 minutes, than the second pyrolysis stage residence time should be between 32.5 and 38.5 minutes in order to be labelled as having an substantially equal residence time.

In another embodiment, the residence time of the first pyrolysis stages is as cited above (viz. between 20-50 minutes, preferably 25-45 minutes and more preferably 30-40 minutes) and the residence time of the second pyrolysis stage b) is shorter, preferably the residence time of the second pyrolysis stage is between 5-10 minutes, more preferably 10-15 minutes and even more preferably 15-20 minutes.

The advantage of this embodiment (in other words an embodiment the residence time of the first pyrolysis stage is substantially longer than the residence time of the second pyrolysis stage) is the feedstock material is not in contact with the higher heat of the kiln as used during the second pyrolysis stage for a prolonged period of time thus preventing unwanted decomposition of the char material. Furthermore, an optimum residence time ensures that the process occurs at an economical rate.

The inventors have after experimentation found that there are preferred temperatures and residence times in order to optimise the volatile content of the char material. The temperature of the first step is chosen to reduce the volatile content of the char material to less than 10 wt. %, and the temperature of the second stage is chosen to reduce the content of the char material to less than 2.5 wt. %, more preferably less than 2.0 wt. %. Importantly, the use of the above described two stage temperature profile in, for example, a rotary kiln operating in counter current mode, is that the total process time is vastly reduced compared to a batch process for the pyrolysis of scrap rubber.

In an example of the invention, the total pyrolyzing step has a duration of between 30 minutes and 80 minutes. This is considerably shorter than comparable methods in the prior art, where the pyrolyzing step has a duration in the order of several hours rather than minutes. Subsequently the invention provides a more economical means for pyrolyzing scrap rubber. There is an energy benefit from the two-step pyrolysis invention compared to the batch process associated with a reduction of wasted energy due to volatile re-adsorption. The invention removes the volatiles much more efficiently than the prior art fully batch-wise process due to the continual flow of gas flowing through a rotary kiln (used in at least one of the pyrolysis stages). Volatile re-adsorption is therefore reduced and also thereby facilitating the possibility to reduce the ultimate volatile content to below 2.0 wt. % in an economically viable manner.

In an embodiment, the second stage of the pyrolysis in step i) the percentage volatiles is reduced to a percentage of less than 1.0 wt. %, wherein the wt. % is based on the total weight of the char material after step i).

The advantage of a volatile content of less than 1.0 wt. % is that such a char material may be milled into a finely divided carbon black powder. The resultant milled carbon black powder has a particle size of less than 50 nm than may be incorporated into valuable end products. The pyrolysis according to the invention allows such a low percentage of volatiles to be achieved.

In an embodiment, step ii) is carried out by jet milling using compressed air or steam.

The carbonaceous char material provided by the two stage pyrolysis process after step i) can be reduced to finely-divided particles or "fluff" form through known pulverization techniques. However, mixing and dispersion of finely-divided particles of carbonaceous char material into rubber and plastics is known to be problematic. Therefore a milling step ii) is conducted to prepare a carbon black powder with a defined particle size distribution.

The advantage of the char material according to the invention over the char material of the prior art is that the char material according to the invention does not block or clog the milling apparatus. This is due to the low volatile content of the char material according to the invention.

The milling step may be conducted in a vibratory mill, in a (air) jet mill or in a combination of a vibratory mill and a (air) jet mill. The inventors found that a combination of a vibratory mill and an air jet mill gave a particle size distribution of D50<2.3 µm and D99<9.2 µm, which produces a carbon black powder suitable for use in high-end products. However, for certain uses milling using a vibratory mill yielding a particle size distribution of D50<9.0 µm and D99<35.0 µm might be sufficient. For example, milling may be conducted on a laboratory size mill at a temperature of 20° C. and at a classifier speed of 22 000 rpm using air as the medium at a pressure of 3 bar. Hot air up to about 220° C. or super-heated steam up to a temperature of around 300° C. may also be used. Air classifier speeds in terms of RPM will vary according to the diameter of the classifier wheel because the peripheral speed of the wheel will increase for a given RPM as the diameter increases. For example, a laboratory jet mill may operate at 22 000 RPM whereas an industrial scale machine having a diameter of 800 mm may achieve the same results at a speed of around 6000 RPM.

In an embodiment, step ii) is carried out in such a way that the carbon black powder obtained from step ii) has a particle size distribution of D50<10 µm and D99<40 µm, preferably D50<5 µm and D99<20 µm, more preferably D50<1 µm and D99<10 µm, even more preferably D50<0.5 µm and D99<2 µm.

The advantage of milling a char material according to the invention is that a particle size distribution of D50<10 µm and D99<40 µm can be obtained. In other words, less than 50% of the particles have a particle size of 10 µm and less than 99% of the particles have a particle size of 40 µm. In an embodiment, step ii) has a particle size distribution of D50<1 µm and D99<4 µm. In other words, less than 50% of the particles have a particle size of 1.0 µm and less than 99% of the particles have a particle size of 4.0 µm.

There are several grades of carbon black on the market. An example of such a grade is N550 having a D50<2.1 µm and D99<6.2 µm. Another example of such a grade is N650 having a D50<2.6 µm and D99<10.9 µm. For these grades the combination of a certain upper limit for D50 and a certain upper limit for D99 is required to provide a level of quality control between batches. However, the other physical characteristics of these carbon blacks.

In an embodiment, an additional step of pelletizing ((step iii)) is carried out after step ii). In other words, the present method comprises a two-stage pyrolysis step, a milling step and a pelletizing step in the present aspect of the invention.

In order to improve the handling and storage of the carbon black powder obtained by milling, a further processing step can be done. The carbon black powder can be pelletized. A loose powder might provide some difficulties during storage and handling compared to a pelletized product. A variety of methods for converting individual particles of carbon black into pellets for improved mixing and dispersion are known to the art. For example, a finely-divided carbon black may be agitated under dry conditions in such a manner as to reduce the quantity of air or other gases associated with the carbon black and cause a degree of agglomeration of the discrete particles of the carbon black.

In an embodiment, step iii) is carried out by mixing a bonding agent with the carbon black powder obtained in step ii) and pelletizing the mixture thus obtained to obtain a pelletized carbon black powder.

Use of a bonding agent is known in the art as pelletizing under wet conditions. In such conditions, the finely-divided carbon black may be agitated in the presence of sufficient liquid pelletizing medium, such as water, or a dilute aqueous solution of a bonding agent. Suitable bonding agents include, but are not limited to, sugar, molasses, dextrin, starch, calcium lignin sulphonate, and the like. The bonding agents permit agglomeration of the individual particles into free-flowing pellets of suitable structural strength and improve stability. A suitable pelletizing agent is, for example, starch, preferably pre-gelatinated starch. Starch may be added in up to 0.5 wt. %, preferably up to 1.0 wt. % based on the weight of the total carbon black powder. The pelletized carbon black powder is therefore facile to handle and is easier to store that the powdery carbon black.

In an embodiment of the present invention a cooling step (step iv) is carried out in between the pyrolysis step and the milling step. During this cooling step the char material obtained during the pyrolysis step is cooled before it being introduced into the milling step.

In an embodiment of the present invention a step of removal of ferromagnetic metal (step v) is carried out prior to the milling step. In some tyres, in particular truck tyres steel (ferromagnetic metal) may be present as reinforcement which metal might have a detrimental effect on the milling process. The use of magnets or magnetic separation is preferable for this step. A person skilled in the art will known which equipment to use for this step.

The invention also relates to a scrap rubber derived carbon black powder, wherein the scrap rubber derived carbon black powder comprises:
a) 60-98 wt. % of carbon black,
b) less than 2.0 wt. % of volatiles,
c) 0-30 wt. % of silica.

The composition of the carbon black powder according to the invention has a surprisingly low volatiles content. This low volatiles content is due to the inventive two-stage pyrolysis method. The composition of the carbon black powder is different depending on the composition of the feedstock. For example, when truck tyres are used, a typical carbon black powder composition comprises 88 wt. % carbon black, 2.7 wt. % silica, 6.5 wt. % residue material, 2.3 wt. % volatiles and 0.5 wt. % water. For example when the feedstock is low silica automobile tyres, a typical carbon black powder composition comprises 75 wt. % carbon black, 13.9 wt. % silica, 7.8 wt. % residue material, 2.2 wt. % volatiles and 0.5 wt. % water. For example when the feedstock is high silica automobile tyres, a typical carbon black powder composition comprises 66 wt. % carbon black, 23.6 wt. % silica, 8.0 wt. % residue material, 1.9 wt. % volatiles and 0.5 wt. % water.

In another embodiment, the carbon black powder has a amount of zinc oxide between 1-5 wt. %, based on the total weight of the carbon black powder.

In another embodiment, the carbon black powder has a amount of zinc sulphide between 1-5 wt. %, based on the total weight of the carbon black powder.

Zinc oxide and zinc sulphide are important reagents in the sulphur cure-activation in rubber compounding, which is a part of the tyre manufacturing process. The inventors have found that it is possible to substantially reduce the amount of zinc oxide that is required to be added into (sulphur-cured) rubber recipes when the present scrap rubber carbon black powder is used as a filler, compared to when prior art carbon black is used. This is due to the presence of zinc oxide and zinc sulphide in the scrap rubber derived carbon black powder. For example at least 3 parts per hundred of rubber (PHR). Zinc oxide must be added to prior art furnace carbon black in order to obtain maximum cross-link density in an ASTM D3191-2010 SBR Test Compound, compared to only 1.5 (PHR) when scrap rubber derived carbon black powder according to the invention is used.

Any reduction in the use of ZnO will benefit the environment by the reduction in the consumption of zinc—a natural resource of finite and rapidly diminishing availability, which has become a cause for global concern. Zinc oxide has also been identified as being an environmentally harmful substance, so any reduction in its use is beneficial.

In another embodiment, the present scrap rubber derived carbon black powder has a particle size distribution of D50<10 µm and a BET surface area of at least 66 m²/g. In other words, at least 50% of the particles of the carbon black powder according to the invention have a particle size distribution of less than <10 µm and the particles have a BET surface area (as defined above) of at least 66 m²/g. High surface area is associated with high polymer: filler interaction and therefore high levels of reinforcement defined by increased rubber reinforcement levels. A particle size distribution D99 of less than 10 µm is necessary for incorporating the carbon black powder in valuable end products. For other, less valuable end products, a higher D99 value may be sufficient.

In another embodiment, a scrap rubber derived carbon black powder has a particle size distribution of preferably D99 less than 30 µm and D50 less than 6 µm, preferably D99 less than 20 µm and D50 less than 4 µm, more preferably D99 less than 9 µm and D50 less than 3 µm, even more preferably more preferably D99 less than 4 µm and D50 less than 0.3 µm.

In another embodiment, scrap rubber derived carbon black powder according to has a particle size distribution of D50<0.15 µm and D99<0.5 µm. In other words, the carbon black powder according to the invention has the same particle size distribution as the furnace black products N550 and N660, which is surprising in light of the prior art carbon black derived from scrap rubber which has a particle size distribution of at least 100 µm.

In another embodiment a scrap rubber carbon black powder according to the invention, has a STSA (statistical thickness) surface area of at between 46-86 m$^2$/g, preferably 59-79 m$^2$/g, even more preferably 64-74 m$^2$/g. The STSA provides an indication of the reinforcing properties of the carbon black when compounded in a rubber composition. An STSA of between 46-86 m$^2$/g, preferably 59-79 m$^2$/g, even more preferably 64-74 m$^2$/ is desirable in order to obtain sufficient reinforcing characteristics.

In an embodiment, a scrap rubber derived carbon black powder according the invention has a polyaromatic hydrocarbon (PAH) content less than 0.50 mg/kg, preferably less than 0.25 mg/kg, more preferably less than 0.01 mg/kg. The two-stage pyrolysis according to the invention also provides a means for controlling the polyaromatic hydrocarbon content in the carbon black powder. The PAH is also exceptionally low when compared to other scrap rubber derived carbon blacks. For example, less than 0.5 mg/kg, preferably less than 0.25 mg/kg, more preferably less than 0.01 mg/kg. Such a low PAH content can not be achieved in a one step pyrolysis process. Typically, after a one step pyrolysis process the carbon black has a PAH content of 71 mg/kg even if the volatile content is only 2.9 wt. %.

The invention therefore provides a surprising level of control over the PAH content of the carbon black powder according to the invention. Controlling the PAH level is highly important as PAH's are carcinogens and as such are controlled substances, levels of which must be kept as low as possible according to industry guidelines.

In another embodiment a scrap rubber derived carbon black powder according to the invention has an oil absorption number between 67-97 m$^3$/g, preferably 72-92 m$^3$/g, more preferably 77-87 m$^3$/g. The advantage of having an oil absorption number between 67 and 87 m$^3$/g is that higher mechanical reinforcing properties such as tensile strength can be obtained.

In another embodiment, the scrap rubber derived carbon black powder of the invention has a primary particle size of 20-40 nm, preferably 26-36 nm, more preferably 28-34 nm. The carbon black powder according to the invention has a highly defined primary particle size of 20-40 nm, preferably 26-36 nm, more preferably 28-34 nm. The invention therefore provides a means for controlling the particle size. This is important as the size of the carbon black particle size determines the strength and reinforcing characteristics of the rubber composition in which the carbon black powder is used. Furthermore, the carbon black powder according to the invention has a primary particle size in the same order of magnitude as commercially available furnace derived carbon black, for example the N500 series has a typical primary particle size of between 40 nm and 48 nm and the N600 series has a typical primary particle size of between 49 nm and 60 nm.

Without wishing to be bound by theory, the milling step provides a means of de-agglomerating large "clumped" particles of char material into finer particles. The finer the particles are milled, the more the primary particles are exposed. Therefore the BET surface area can be controlled, by controlling the D99 particle size distribution during the milling process.

The invention also relates to a scrap rubber derived carbon black pellet comprising:
  a) 60-98 wt. % of carbon black,
  b) less than 2.0 wt. % of volatiles,
  c) 0-30 wt. % of silica and
  d) 0.5-1.0 wt. % starch.

All embodiments cited for the scrap rubber derived carbon black powder are also applicable for the scrap rubber derived carbon black pellet.

In another embodiment, the scrap rubber derived carbon black pellet has a bonding agent which is pre-gelatinated starch.

In another embodiment, the scrap rubber derived carbon black pellet has a starch, preferably pre-gelatinated starch concentration of preferably between 0.1 and 6.0 wt. %, more preferably 0.3 and 5.0 wt. %, even more preferably 0.5 and 3.0 wt. %, even more preferably 0.5 and 1.5 wt. % of the total weight of the scrap rubber derived carbon black pellet. The weight percentage of the bonding agent is optimised to produce a pellet suitable for mixing in rubber compositions. If the weight percentage is too low, the pellet will not hold together and if the weight percentage if the bonding agent is too high, the pellet will not disperse in the rubber compounding step.

The invention also relates to the use of a scrap rubber derived carbon black powder according to the present invention or obtained via the present methods in one or more of a rubber composition, an ink, a paint, a bitumen, a thermoplastic composition and a thermoplastic elastomer. The inventive carbon black powder or pellet can be incorporated as a reinforcing additive in e.g. SBR and EPDM rubbers.

The invention also relates to a rubber composition comprising a scrap rubber derived carbon black powder according to the invention, having a tensile strength of 15-30 MPa, preferably 20-29 MPa, more preferably 22-28 MPa. When the carbon black powder according to the invention is used in an EPDM rubber as a reinforcing component, the EPDM rubber has a tensile strength of more than 15 MPa. For example, an EPDM rubber comprising 100 PHR carbon black powder according to the invention has a tensile strength of 15.7 MPa, compared to 15.5 MPa or 15.9 MPa when N600 and N500 is used respectively. The scrap rubber derived carbon black powder therefore imparts advantageous properties to the EPDM rubber. This is surprising in light of other scrap rubber derived carbon black produced by prior art methods.

Also, in an SBR rubber composition, for example, the scrap rubber derived carbon black according to the invention also has a positive effect on the mechanical properties of the rubber. When 50 PHR units of carbon black powder according to the invention is added to an SBR composition, the resultant composition has a tensile strength of 25.1 MPa. This remarkably high tensile strength is comparable to the tensile strength obtained in an SBR composition comprising commercially available furnace black N550 (25.2 MPa) and even better than the tensile strength of an SBR composition comprising commercially available furnace black N600 (21.6 MPa). Other standard means for measuring the mechanical properties of a rubber composition, for example the DeMattia flex fatigue and rebound resilience (Schob) are also comparable between the scrap derived carbon black powder comprising rubber composition and the furnace black comprising rubber composition.

The mechanical properties of rubber compositions comprising scrap rubber derived carbon black powder according to the present inventions are similar showing that scrap rubber derived carbon black powder can be added to rubber compositions without compromising the physical properties of the rubber compositions.

The invention will be further elucidated by means of a Drawing explained below.

DRAWING

FIG. 1 shows a process flow diagram for the process according to the invention.

DESCRIPTION OF THE DRAWING

FIG. 1 shows a process flow diagram that explains an embodiment of the present invention. This flow diagram is not limiting to the present invention but merely for illustrative purposes.

Granulated feedstock tyres (scrap rubber) are blended from two feedstock hopper (1) in a feedstock blender (2). The resultant blended feedstock is added to a first rotary kiln (3) in which the at least first pyrolysis stage a) takes place to obtain an intermediate char material. The intermediate char material is added to a second kiln (polisher kiln, 4) to obtain a char material according to the present invention.

The volatiles released in the first and at least second pyrolysis stage are collected in receiving lines (5) and optionally used for steam generation or electricity generation. The condensable volatiles (viz. oils) collected from the at least first pyrolysis stage are condensed in a condenser (7).

Subsequently, the obtained char material is fed into a char cooler (8), which char material is then de-aggregated in a break mill (9). A magnetic separator (10) is used to remove any remaining steel components (resulting from steel reinforcement of the feedstock tyres) prior to feeding the char material into a jet milling apparatus (11). The product from the milling step is known as a carbon black powder and is subsequently pelletized in a pelletizer (12). The pelletized carbon black powder is then fed through a fluid bed (13) to yield the final product carbon black powder (14).

The invention shall now be exemplified by a number of non-limiting examples.

EXAMPLES

The following examples show several process steps of the present invention.
Pyrolysis
This example shows a rotary kiln operating in a two-stage pyrolysis mode.

The scrap rubber obtained from tyres were added to the pyrolysis apparatus in the form of a granulate wherein 100% of the particles have a length of less than 30 mm, a width less than 25 mm and a height less than 30 mm, and 95% of the particles have a length of less than 25 mm, have a width of less than 25 mm and a height of less than 25 mm. The composition of the scrap rubber obtained from the feedstock tyres having either a low silica content (A), an average silica content (B) or a high silica content (C) is shown in Table 1 below. All the numbers are In percentage by weight, based on the total weight of the scrap rubber.

TABLE 1

The composition of typical feedstock tyres is:

|  | A (low silica) | B (average silica) | C (high silica) |
|---|---|---|---|
| Residual material | 4.9 | 9.8 | 15.4 |
| (Silica) | (1.4) | (5.5) | (11.2) |
| Volatiles | 64.4 | 62.2 | 61.0 |
| Theoretical yield carbon black | 30.7 | 28.0 | 23.6 |

Table 2 below discloses the conditions that were used for the pyrolysis of several Examples according to the invention (Examples 1-7) and not-according to the invention (comparative Example). The Examples 1 and 2 where carried out in two parts, 1A and 1B, and 2A and 2B, respectively. 1A and 2A relate to the first stage pyrolysis process whereas 1B and 2B relate to the second stage pyrolysis process. This was done in order to determine the percentage of volatiles in the intermediate char material obtained after the first pyrolysis stage (1A and 2A).

TABLE 2

Conditions used for the first and second stage of the pyrolysis step and the volatile content of the product obtained therefrom.

| Example | Feedstock Scrap rubber | First pyrolysis stage "charring" | | Second pyrolysis Stage "polishing" | | Char material |
|---|---|---|---|---|---|---|
| | | Temperature/° C. | Residence time/min | Temperature/ ° C. | Residence time/min | Volatiles (wt. %) |
| 1A | B | 500-600 | 30 | Not done | Not done | 29.96 |
| 1B | Intermediate char from 1A | — | — | 575 | 30 | 3.1 |
| 2A | A | 550-650 | 20-30 | — | — | 2.37 |
| 2B | Intermediate char from 2A | — | — | 650-750 | 5-10 | 1.33 |
| 3 | A | 650 | 30 | 650 | 30 | 2.3 |
| 4 | B | 650 | 30 | 650 | 30 | 2.2 |
| 5 | C | 650 | 30 | 650 | 30 | 1.9 |
| 6 | A | 550-650 | 20-30 | 650-750 | 5-10 | 0.9 |
| 7 | B | 550-650 | 20-30 | 650-750 | 5-10 | 2.4 |
| Comp. 1 | A | 550-650 | 20-30 | Not done | Not done | 2.9 |

Examples 1-7 and Comparative Example 1

An electrically heated rotary kiln was setup using an expanded 238 mm (9.38") OD cylinder tube with an integral internal flight cartridge, no cooling zone, a sealed feed hopper assembly with two slide gates to minimize air infiltration, two heaters that were installed in series with respect to each other to preheat the nitrogen gas before entering the feed breeching and cylinder. A two-stage condenser system after discharge breeching was installed to collect the condensable oil that was produced during the pyrolysis. A gas totalizer with a bypass arrangement was installed in the vent line downstream of the condenser to take periodic measurements of the off-gas flow rate. The kiln was set up for concurrent flow. A nitrogen purge was used to maintain an inert atmosphere in the interior of the kiln during the pyrolysis; the product bin containers were also purged with nitrogen.

The tyre pyrolysis process was performed in two stages, with the equipment systems as described above. The first stage being the "charring" stage where 10 kg of feed material was heated to the point of releasing the volatiles (concurrent operation) and the kiln was rotated at 1-2 rpm; and the second stage being the "polishing and cooling" stage where the intermediate char material with a small amount of remaining residual volatile matter was removed and the kiln was rotated at 3-4 rpm. As noted in the Table 2 above for some of the Examples and Comparative Example either the first or second pyrolysis stage was omitted.

Prior to conducting the test trials, all of the off-gas vent line system components were weighed and recorded so as to get an accurate mass balance of the material build up for the first stage and the second stage the charring stage of the tyre pyrolysis.

Polyaromatic Hydrocarbon (PAH) Analysis

The char material obtained from the pyrolysis of scrap tyres as described in Examples 6, 7 and Comparative Example 1 was analysed according to DIN 51720-2001 (volatile content), DIN 51719-1197 (ash content) and DIN ISO 11465-1996 (moisture) and Merkbl. 1, LUA-NRW (GC-MSD) (PAH). The material prepared according to the invention (viz. Example 6 and Example 7) was compared to the material prepared according to the prior art (Comparative Example 1), which had only been processed in the first pyrolysis stage. Two additional char materials have been tested, both are non-commercially available products that are denoted as Comparative Example 2 (obtained from Carbon Clean Tech, Germany) and Comparative Example 3 (obtained from Erus d.o.o., Slovenia) These Comparative Examples 2 and 3 are both carbon black powders obtained by prior art methods. The composition of the char materials is given in Table 3 below and the polyaromatic hydrocarbon analysis is given in Table 4 below.

TABLE 3

Comparison of char material obtained by the invention and prior art.

| Example | Carbon Black, % | Residual material, % | Volatiles, % | Moisture, % | PAH, mg/kg | Total |
|---|---|---|---|---|---|---|
| 6 | 85.0 | 13.3 | 0.9 | 0.8 | 0.0 | 100.0 |
| 7 | 75.6 | 21.4 | 2.4 | 0.7 | 0.0 | 100.0 |
| Comparative example 1 | 82.5 | 13.4 | 2.9 | 1.2 | 71.0 | 100.0 |
| Comparative example 2 | 79.9 | 13.1 | 5.6 | 1.4 | 60.0 | 100.0 |
| Comparative example 3 | 67.0 | 17.0 | 15.2 | 0.8 | 15.0 | 100.0 |

TABLE 4

PAH content for the char material listed in Table 3

| Polyaromatic hydrocarbons | Units | Ex. 6 | Ex. 7 | Comp. Ex. 1 | Comp. Ex. 2 | Comp. Ex. 3 |
|---|---|---|---|---|---|---|
| Naphthalene | mg/kg | <0.050 | <0.14 | 39.00 | 7.0 | 1.3 |
| Acenaphthylene | mg/kg | <0.050 | <0.14 | <0.2 | 0.43 | <0.05 |
| Acenaphthene | mg/kg | <0.050 | <0.14 | <0.2 | 1.4 | 0.52 |
| Fluorene | mg/kg | <0.050 | <0.14 | <0.2 | 2.0 | 0.46 |
| Phenanthrene | mg/kg | <0.050 | <0.14 | 5.3 | 6.9 | 1.2 |
| Anthracene | mg/kg | <0.050 | <0.14 | 1.5 | 2.5 | 0.63 |
| Fluoranthene | mg/kg | <0.050 | <0.14 | 1.3 | 5.1 | 1.70 |
| Pyrene | mg/kg | <0.050 | <0.14 | 2.4 | 9.8 | 2.50 |
| Benz[a]anthracene | mg/kg | <0.050 | <0.14 | 2.3 | 7.0 | 1.3 |
| Chrysene | mg/kg | <0.050 | <0.14 | 2.00 | 8.0 | 1.4 |
| Benzo[x]fluoranthene wherein x is b; j; k; or j, k | mg/kg | <0.050 | <0.14 | 2.1 | 9.0 | 2.2 |
| Benzo[a]pyrene | mg/kg | <0.050 | <0.14 | 2.0 | 7.5 | 1.7 |
| Dibenz[a,h]anthracene | mg/kg | <0.050 | <0.14 | 0.21 | 0.69 | <0.05 |
| Benzo[ghi]perylene | mg/kg | <0.050 | <0.14 | 0.63 | 1.2 | <0.05 |
| Indeno[1,2,3-cd]pyrene | mg/kg | <0.050 | <0.14 | 1.4 | 2.3 | <0.05 |

Milling

The char materials obtained in Examples 6 and 7 were milled in an Lab AFG 100 milling apparatus (from Hosokawa Alpine). The milling apparatus was operated at a temperature of 20° C. and 22 000 rpm using air as the medium at a pressure of 3 bar, the feed was added directly to the miller through 3 nozzles with a diameter of 1.9 mm.

The milled product was measured for particle size distribution (D50 & D99) using wet laser diffraction on a Malvern Mastersizer S Ver 2.19. The range lens was 300 RF mm, the beam length was 2.40 mm. The analysis mode used was Polydisperse. A mixture the commercially available Morvet®+Supragil® (used in a ratio of 70:30) was used as the wetting agent and external ultra-sound was applied to prevent aggregation of the particles. The obtained results are shown in Table 5 and Table 6 below. In Table 6 below measurements were carried out on two commercially available furnace blacks denoted as Comparative Example 4 (N550 of Birla Carbon) and Comparative Example 5 (N660 of Birla Carbon).

TABLE 5

Particle size distribution of milled carbon black powder according to the invention.

| Example | Milling apparatus used | D99 | D50 | BET |
|---|---|---|---|---|
| 2B | Vibratory + air jet (1.3 kWh/kg) | 5.4 μm | 1.4 μm | 90.4 m²/g |
| 2B | Vibratory + air jet (1.3 kWh/kg) | 8.2 μm | 2.3 μm | 83.9 m²/g |
| 2B | Vibratory | 35.0 μm | 9.0 μm | 70.7 m²/g |
| 6 | Vibratory + air jet | 4.14 μm | 0.95 μm | Not measured |
| 7 | Vibratory + air jet | 3.95 μm | 0.80 μm | Not measured |

TABLE 6

Particle size distribution and BET surface area of scrap rubber derived carbon black powder (according to the invention) and furnace black (prior art).

| Example | Type of carbon black powder | Particle Size Distribution | BET Surface Area, m²/g |
|---|---|---|---|
| Comparative example 4 | N550 (furnace) | [D50 < 2.06 μm/ D99 < 6.2 μm] | 40-49 |
| Comparative example 5 | H660 (furnace) | [D50 < 2.6 μm/ D99 < 10.9 μm] | 33-30 |
| 2 | Scrap rubber derived | [D50 < 1.56 μm/ D99 < 5.4 μm] | 90.4 |

EPDM Rubber Compounding

Rubber compositions were made by mixing scrap rubber derived carbon black powder or commercially available furnace derived carbon with an EPDM rubber and other components as shown in Table 7.

TABLE 7

Composition of an EPDM rubber comprising scrap rubber derived carbon black.

| Ingredient | PHR |
|---|---|
| Keltan 8340A (EPDM) | 100 |
| Carbon black of Ex. 2 OR comparative example 4 OR comparative example 5 | 110 |
| Paraffinic oil | 70 |
| Zinc oxide | 5 |
| Stearic acid | 1 |
| Sulphur-80 | 1.9 |
| ZDEC-80 | 2.5 |
| MBT-80 | 0.6 |
| TMTD-80 | 0.6 |
| Total | 291.6 |

The composition of the commercially available rubber used (Keltan) is further elucidated in Table 8 below.

TABLE 8

Composition of Keltan ® 8340A

| Keltan 8340A | Value |
|---|---|
| Ethylidene norbornene, wt. % | 5.5 |
| Oil, wt. % | 0.0 |
| Ethylene, wt. % | 55 |
| ML (1 + 4) 125° C. | 80 |

Measurements on the mechanical properties of the rubber compositions are summarized in Table 9 below. Comparative Example 6 is a rubber composition according to Table 7 wherein a carbon black according to Comparative Example 4 is used. Comparative Example 7 is a rubber composition according to Table 7 wherein a carbon black according to Comparative Example 5 is used. Example 8 is a rubber composition according to Table 7 wherein a carbon black according to Example 2 (after steps 2A and 2B) is used.

TABLE 9

Mechanical properties of EPDM rubber compositions comprising scrap derived carbon black and furnace derived carbon black.

| Rubber composition Example | Carbon black | Tensile strength (MPa) #1 | M100 (MPa) #2 | M300 (MPa) #3 | DeMattia flex fatigue (kilocycles) #4 | rebound resilience (Schob) #5 |
|---|---|---|---|---|---|---|
| Comp. Ex. 6 | Comp. Ex. 4 | 15.9 | 3.1 | 10.4 | >20 | 40 |
| Comp. Ex. 7 | Comp. Ex. 5 | 15.5 | 2.5 | 8.8 | >20 | 43 |
| Ex 8 | Ex. 2 | 15.7 | 1.8 | 6.7 | >20 | 46 |

1: Tensile strength was measured according to ISO 37-2011.
2: M100 was measured according to ISO 37-2005.
3: M300 was measured according to ISO 37-2005.
4: DeMattia flex fatigue was measured according to ASTM D2230-2012.
5: Rebound resilience (Schob) was measured according to ISO4662-2009.

The measurements shown in Table 8 clearly show that the EPDM rubber composition of Example 8 according to the present invention has a much lower M100 and M300 stiffness moduli while maintaining the tensile strength compared to the prior art rubber compositions.

Example 4 is used. Comparative Example 9 is a rubber composition according to Table 9 wherein a carbon black according to Comparative Example 5 is used. Example 9 is a rubber composition according to Table 9 wherein a carbon black according to Example 2 (after steps 2A and 2B) is used.

TABLE 12

Mechanical properties of SBR rubber compositions comprising scrap derived carbon black and furnace derived carbon black

| Rubber composition Example | Carbon black | tensile strength (MPa) #1 | M100 (MPa) #2 | M300 (MPa) #3 | elongation (%) #4 | DeMattia flex fatigue (kilocycles) #5 | rebound resilience (Schob) #6 |
|---|---|---|---|---|---|---|---|
| Comp. Ex 8 | Comp. Ex. 4 | 25.2 | 3.5 | 17.2 | 450 | 5 | 52 |
| Comp. Ex 9 | Comp. Ex. 5 | 21.6 | 2.5 | 12.4 | 500 | 20 | 55 |
| Ex. 9 | Ex. 2 | 25.1 | 2.1 | 10.3 | 535 | 20 | 55 |

1: Tensile strength was measured according to ISO 37-2011.
2: M100 was measured according to ISO 37-2005.
3: M300 was measured according to ISO 37-2005.
4: Elongation was measured according to ISO 37-2005.
5: DeMattia flex fatigue was measured according to ASTM D2230-2012.
6: Rebound resilience (Schob) was measured according to ISO4662-2009.

Such combination of properties allows higher loading of the carbon black powders according to the present invention compared to the carbon black powders of prior art without compromising physical properties. This will result in reduced compound cost due to increased dilution of the more expensive polymer.

SBR Rubber Compounding

Rubber compositions were made by mixing scrap rubber derived carbon black powder or commercially available furnace derived carbon with an SBR rubber and other components as shown in Table 10. Rubber compositions were made according to ASTM D3191-2010.

TABLE 10

SBR rubber compositions

| Ingredient | PHR |
|---|---|
| SBR 1500 | 100 |
| Carbon black of Ex. 2 OR Comp. Ex. 4 OR Comp. Ex. 5 | 50 |
| Zinc oxide | 3 |
| Sulfur - 80 | 1.75 |
| TBBS | 1 |
| Stearic acid | 1 |

The composition of the commercially available rubber used (SBR 1500) is further elucidated in Table 11 below.

TABLE 11

The specification of SBR 1500

| SBR 1500 | Value |
|---|---|
| Polymerization | cold, emulsion |
| ML (1 + 4) 100° C. | 52 |
| Bound styrene, wt. % | 23.5 |

Measurements on the mechanical properties of the rubber compositions are summarized in Table 12 below. Comparative Example 8 is a rubber composition according to Table 9 wherein a carbon black according to Comparative Similar to the EPDM rubber compositions reported above, the SBR rubber composition of Example 9 according to the present invention has a much lower M100 and M300 stiffness moduli and a much higher elongation compared to compositions according to the Comparative Examples, while maintaining the tensile strength.

The composition of Example 9 has a particularly superior combination of mechanical properties with respect to the comparative compositions. Comparative example 8 has a high tensile strength but the elongation is low and the flex fatigue is especially low. Comparative example 9 has a reasonable elongation and flex fatigue, but the tensile strength is low. The composition of Example 9 has good properties in all of these respects.

Such combination of properties allows higher loading of the carbon black powders according to the present invention compared to the carbon black powders of prior art without compromising physical properties.

Activity of ZnO in Scrap Rubber Derived Carbon Black Powder

In order to assess the activity of zinc oxide (ZnO) several tests were carried out. Zinc Oxide has an effect on the crosslink density. Preferably the lowest amount of ZnO that will still give maximum crosslink density is used. In other word, it is preferred to keep the amount of ZnO as low as possible. Therefore, there is sought a carbon black that provides maximum crosslink density at a low amount of ZnO.

Rubber compositions comprising SBR 1500 (ASTM D3191-2010), a carbon black powder (either of Example 2 or of Comparative Example 4) and various amounts of zinc oxide were made and vulcanized. From the results thereof the amount of ZnO at which maximum crosslinking density was obtained was determined.

A rubber composition comprising carbon black according to Comparative Example 4 showed a maximum crosslink-density at 3 wt. % added ZnO.

The composition comprising the carbon black powder of Example 2 showed a maximum crosslink-density at 1.5 wt. % added ZnO. An increase of the added ZnO to 3 wt. % did not give a further increase of crosslink-density.

From these experiments it can be deduced that less ZnO is required when the carbon black according to the present invention is used compared to the prior art. The present inventions believe, without wishing to be bound by any theory, that the carbon black according to the present invention already comprises a certain amount of ZnO so that the addition of extra ZnO during rubber compounding can be reduced significantly, which is a benefit of the present invention.

The above experiments clearly show that one or more objects of the present invention are obtained by the embodiments cited above and in the appended claims.

The invention claimed is:

1. A method for recycling a scrap rubber, which method comprises the following steps:
   i) pyrolyzing a scrap rubber to obtain a char material;
   ii) milling the char material obtained in step i) to obtain a carbon black powder;
   characterized in that the pyrolysis in step i) comprises at least a two-stage pyrolysis process, wherein the said two-stage pyrolysis process comprises:
   a) a first pyrolysis stage to obtain an intermediate char material and
   b) a second pyrolysis stage to obtain a char material, characterized in that the first pyrolysis stage a) is carried out in a first rotary kiln and the second pyrolysis stage b) is carried out in a second rotary kiln, wherein the temperature during the first pyrolysis stage a) is between 630-670° C. and the temperature during the second pyrolysis stage b) is between 680-720° C., the temperature during the second pyrolysis stage b) being higher than the temperature during the first pyrolysis stage a),
   wherein the char material obtained from the second pyrolysis stage has a polyaromatic hydrocarbon (PAH) content less than 0.5 mg/kg.

2. The method according to claim 1, wherein in the at least first pyrolysis stage a) the percentage of volatiles present in said scrap rubber is reduced to an amount of about 5-10 wt. % based on the total weight of the intermediate char material, and wherein the intermediate char material is introduced in the second pyrolysis stage b) in which the percentage volatiles is further reduced to a percentage of less than 2.5 wt. %, based on the total weight of the char material.

3. The method according to claim 1, wherein the residence time of each the first pyrolysis stage a) and the second pyrolysis stage b) are between 20-50 minutes, and the residence time of each of the first pyrolysis stage a) and the second pyrolysis stage b) is equal in duration.

4. The method according to claim 1, wherein in the second pyrolysis stage b) the percentage volatiles is reduced to less than 1.0 wt. % based on the total weight of the char material.

5. The method according to claim 1, wherein the milling of step ii) is carried out by jet milling using compressed air or steam.

6. The method according to claim 1, wherein the milling of step ii) is carried out in such a way that the carbon black powder obtained from step ii) has a particle size distribution of D50<10 µm and D99<40 µm.

7. The method according to claim 1, wherein the temperature in the second pyrolysis stage b) is at least 30° C. higher than in the first pyrolysis stage a).

8. The method according to claim 1, wherein the rotary kiln is a cylindrical vessel, inclined slightly to the horizontal, which is rotated about its axis, wherein the material to be processed is fed into an upper end of the cylinder and gradually moves down towards a lower end as the kiln rotates.

9. The method according to claim 1, wherein the scrap rubber is tyres.

10. The method according to claim 2, wherein in the at least first pyrolysis stage a) the percentage of volatiles present in said scrap rubber is reduced to an amount of about 5-10 wt. % based on the total weight of the intermediate char material, and wherein the intermediate char material is introduced in the second pyrolysis stage b) in which the percentage volatiles is further reduced to a percentage of less than 2.0 wt. %, based on the total weight of the char material.

11. The method according to claim 3, wherein the residence time of each the first pyrolysis stage a) and the second pyrolysis stage b) are between 25-45 minutes.

12. The method according to claim 3, wherein the residence time of each the first pyrolysis stage a) and the second pyrolysis stage b) are between 30-40 minutes.

13. The method according to claim 6, wherein the milling of step ii) is carried out in such a way that the carbon black powder obtained from step ii) has a particle size distribution of D50<5 µm and D99<20 µm.

14. The method according to claim 6, wherein the milling of step ii) is carried out in such a way that the carbon black powder obtained from step ii) has a particle size distribution of D50<1 µm and D99<10 µm.

15. The method according to claim 6, wherein the milling of step ii) is carried out in such a way that the carbon black powder obtained from step ii) has a particle size distribution of D50<0.5 µm and D99<2 µm.

16. The method according to claim 1, wherein the temperature in the second pyrolysis stage b) is at least 50° C. higher than in the first pyrolysis stage a).

17. The method according to claim 1, wherein the temperature in the second pyrolysis stage b) is at least 30° C. higher than the first pyrolysis stage.

18. The method according to claim 1, wherein the temperature in the second pyrolysis stage b) is at least 80° C. higher than in the first pyrolysis stage a).

19. The method according to claim 1, wherein the char material has a polyaromatic hydrocarbon (PAH) content less than 0.25 mg/kg.

20. The method according to claim 1, wherein the char material has a polyaromatic hydrocarbon (PAH) content less than 0.01 mg/kg.

* * * * *